Feb. 11, 1964 J. W. BRINEY ETAL 3,120,765
PRECISION ADJUSTING TOOL
Filed April 30, 1962
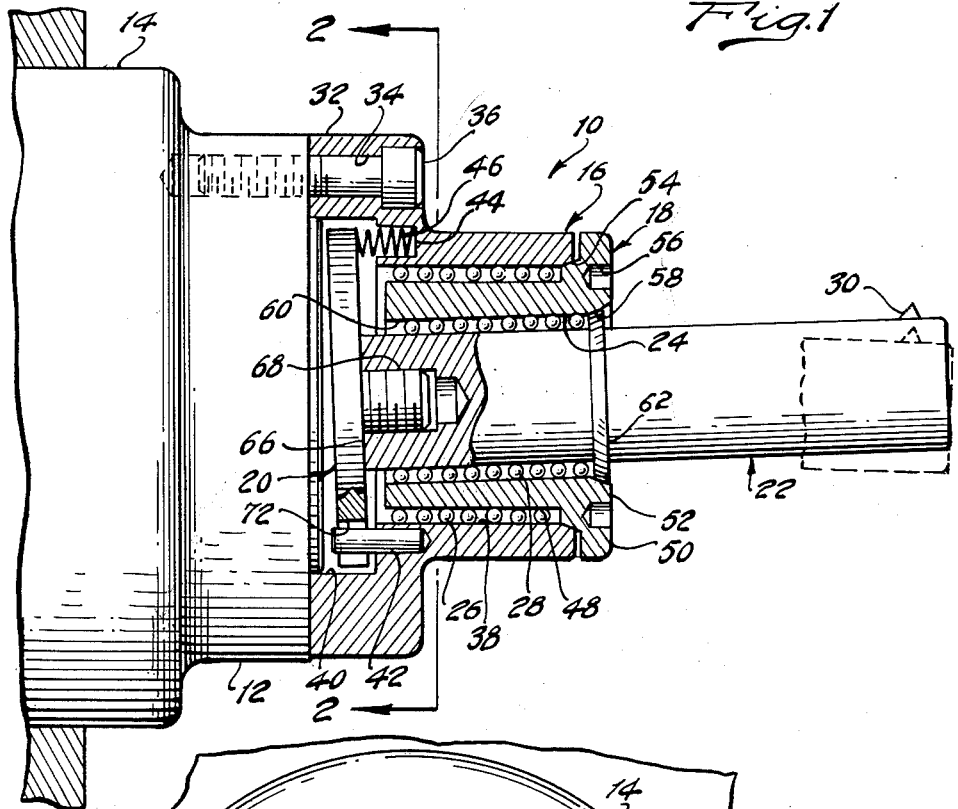
INVENTORS.
JAMES W. BRINEY
BY OTTIS R. BRINEY JR.
Whittemore
Hulbert & Belknap
ATTORNEYS

United States Patent Office 3,120,765
Patented Feb. 11, 1964

3,120,765
PRECISION ADJUSTING TOOL
James W. Briney and Ottis R. Briney, Jr., Pontiac, Mich., assignors to Briney Manufacturing Company, Pontiac, Mich., a corporation of Michigan
Filed Apr. 30, 1962, Ser. No. 190,961
7 Claims. (Cl. 77—58)

The invention relates to precision adjusting tools and refers more specifically to a quill for rotatably supporting a boring bar, including an adjusting sleeve having an inclined boring bar receiving passage for effecting radial adjustment of the boring bar.

In the past precision adjusting tools have been known which were capable of providing precise radial adjustment of a boring bar. The radial adjustment of a boring bar has in the past often been accomplished by means of a radially eccentric passage in which the boring bar is received, and means for effecting relative rotation between the passage and boring bar. Such radial adjustment is necessarily limited by the degree of eccentricity of the eccentric passage which in the past has been axially parallel to the axis of rotation of the quill.

Therefore, one of the objects of the present invention is to provide a quill rotatably supporting a boring bar, including improved means for radially adjusting the boring bar relative to the axis of rotation of the quill.

Another object of the invention is to provide a quill rotatably supporting a boring bar, said quill having an inclined passage therethrough receiving the boring bar, and means for rotating the inclined passage relative to the boring bar.

Another object is to provide a quill rotatably supporting a boring bar, comprising an outer body member having a passage therethrough concentric with the axis of rotation of the boring bar, a sleeve within the passage having an outer surface concentric therewith and an inner surface concentric with the outer surface at one end and eccentric thereto at the other end receiving the boring bar, means for holding the boring bar within the passage, preloaded anti-friction bearings between the sleeve and housing and between the sleeve and boring bar, and means for effecting relative rotation between the sleeve and boring bar.

Another object is to provide a quill rotatably supporting a boring bar as set forth above wherein the means securing the boring bar within the passage comprises a radially extending abutment centrally of the boring bar, and a retaining disc removably secured to the end of the boring bar received in said passage, and means resiliently holding the disc in spaced relation with respect to the body of the quill whereby the abutment is held in engagement with the sleeve.

Another object is to provide a quill rotatably supporting a boring bar as set forth above wherein means are provided to prevent relative rotation between the body member and the retaining disc.

Another object is to provide a quill rotatably and radially adjustably supporting a boring bar which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a longitudinal section view of a quill rotatably supporting a boring bar constructed in accordance with the invention secured to an adapter and spindle illustrated in elevation.

FIGURE 2 is a cross section of the quill illustrated in FIGURE 1 taken substantially on the line 2—2 in FIGURE 1.

With particular reference to the figures of the drawing one embodiment of the present invention will now be disclosed.

As shown in FIGURE 1 the quill 10 of the invention is supported for rotation with a spindle 14. The quill 10 includes the body member 16, sleeve 18 and the retaining and driving disc 20 operable to secure the boring bar 22 in the inclined passage 24 provided in the sleeve 18. Sets of preloaded anti-friction bearings 26 and 28 separate the body member and sleeve 16 and 18 and the sleeve and boring bar 18 and 22, respectively, as shown.

In operation the sleeve 18 is rotated relative to the boring bar 22 to provide radial adjustment of a cutter 30 carried by the boring bar. The inclined passage 24 permits greater radial adjustment than was previously possible with an eccentrically held boring bar receiving passage having an axis parallel to the axis of rotation of the quill 10.

More specifically the body member 16 comprises a cylindrical member including a flange 32 at one end thereof having angularly spaced openings 34 extending therethrough through which screws 36 extend to secure the body 16 to the spindle 14 in the usual manner. The body 16 is further provided with a passage 38 concentric with the axis of rotation of the quill 10 and extending therethrough. Passage 38 has a radially enlarged end portion 40 as shown best in FIGURE 1.

A pin 42 is supported by the body member within the radially enlarged portion 40 of the passage 38 and extends axially of the passage 38 as shown in FIGURE 1. A plurality of recesses 44 are similarly provided in the body member spaced angularly about the radially enlarged portion 40 of the passage 38 and extending axially thereof to receive the spring means 46 as will be considered in more detail subsequently.

Sleeve 18 is positioned within the passage 38 and is provided with a radially outer surface 48 which is concentric with the axis of rotation of quill 10 and spindle 14. Sleeve 18 is further provided with the radially extening bearing flange 50 on the end 52 thereof abutting the tapered portion 54 of the body 16 which provides a bearing surface therefor. Recesses 56 are provided in the end 52 of the sleeve 18 to receive portions of a wrench for rotating the sleeve 18 relative to the body 16.

Sleeve 18 is further provided with a passage 24 therethrough which is inclined with respect to the axis of rotation of the quill and/or spindle 10. That is to say the annular tapered end 58 of the opening 24 is substantially concentric with the axis of rotation of the quill 10 while the end 60 thereof is eccentric with respect to the axis of rotation of the quill 10.

With such construction the cutter 30 carried by a boring bar 22 received in passage 24 will be moved radially on rotation of the sleeve relative to the boring bar. Further the radial movement of the cutter 30 of the boring bar 22 is not limited by the eccentricity of the end 60 of the sleeve 18 but instead is determined by the relative length of the boring bar 22 between the opposite ends of the sleeve 18 and between the annular tapered end 58 of the opening 24 and the cutter 30.

The boring bar 22 which is received within the inclined passage 24 is provided with an annular tapered abutment 62 extending therearound and engageable with the annular tapered end 58 of opening 24. The retaining and driving disc 20 is secured to the end 66 of the boring bar 22 by the screw threads on portion 68 thereof as shown best in FIGURE 1.

A plurality of recesses 44 are provided spaced angularly about the periphery of the body member 16. The recesses 44 could if desired be provided in the retaining disc 20 instead of in the body 16. Thus the springs 46 positioned in recesses 44, as shown in FIGURE 1, urge the annular tapered abutment 62 on the boring bar 22 into engagement with the annular tapered end 58 of the sleeve 18 and the sleeve 18 into engagement with the tapered portion 54 of the body 16. Retaining and driving disc 20 thus floats within the radially enlarged portion 40 of the passage 38 to permit angular movement thereof with respect to the axis of rotation of the quill 10 with the boring bar 22 on rotation of sleeve 18 relative thereto.

Retaining and driving disc 20 is further provided with a radially extending slot 72 therein in which the pin 42 extends. Slot 72 is dimensioned to permit slight radial movement of the retaining and driving disc 20 relative to the body member 16 but to prevent any relative rotation therebetween. Radial movement of disc 20 allowing radial adjustment of the boring bar 22 is therefore permitted during relative rotation between the sleeve 18 and boring bar 22, while relative rotation between the body member 16 and boring bar 22 on rotation of sleeve 18 relative thereto is prevented.

Thus in operation with the quill 10 assembled as shown in FIGURE 1, assume that it is desired to adjust the radial position of the cutter 30 carried by the boring bar 22 relative to the axis of rotation of quill 10. With the structure of the invention it is only necessary to position a wrench in the recesses 56 and rotate the sleeve 18 relative to the body member 16. As will be understood suitable graduations may be provided on the body member 16 or on sleeve 18 to indicate the amount of adjustment accomplished for a particular angular displacement of tool 22 if desired.

Since the boring bar 22 and retaining and driving disc 20 are prevented from relative rotation with respect to the body member 16 by driving pin 42 and slot 72 rotation of sleeve 18 will produce rotation of the sleeve 18 around the boring bar 22. Such rotation of the sleeve 18 around the boring bar 22 will in the illustrated embodiment of the invention produce pivoting of the boring bar 22 about an axis at right angles to the axis of rotation of the quill 10 in a plane defining the concentric end of the passage 24. During the pivoting of the boring bar 22 caused by relative rotation between the boring bar and sleeve the retaining disc 20 will compress or relieve springs 46 as necessary to allow movement of disc 20.

Thus it will be readily understood that the provision of the inclined opening in the sleeve 18 permits a wide variation in the possible radial adjustment of a cutter 30 carried by a boring bar 22 which is not limited by the particular eccentricity of the passage 24 as has previously been the case with quills wherein the axis of the passage 24 has been parallel to the axis of rotation of the quill. That is to say, the radial adjustment of the cutter 30 on the boring bar 22 will be a multiple of the eccentricity of the eccentric end 60 of the passage 24 which will be determined by the length of the boring bar 22.

While one embodiment of the present invention has been disclosed in detail it will be understood that other modifications thereof are contemplated. Thus it will be understood that either or both ends of the passage 24 may be eccentric. It is therefore intended to include all such modifications as suggest themselves from the above disclosure within the scope of the invention.

The drawings and the foregoing specification constitute a description of the improved precision adjusting tool in such full, clear, concise and exact terms as to enable any person skilled in the art to practice the invention, the scope of which is indicated by the appended claims.

What we claim as our invention is:

1. A quill supporting a boring bar for rotation and radial adjustment, comprising a rotatable body member having a passage therethrough concentric with the axis of rotation thereof, a sleeve rotatably positioned within said passage and having an outer surface concentric with the axis of rotation of the body member, the inner surface of the sleeve defining a passage inclined to the axis of rotation of the body member, a boring bar received within the sleeve, means for securing the boring bar within the sleeve, including a tapered portion at one end of the sleeve, an annular abutment on the boring bar centrally thereof for engagement with the tapered portion of said sleeve, a retaining and driving disc secured to one end of the boring bar adjacent the other end of the sleeve, and resilient means acting between the body member and retaining and driving disc urging the abutment into engagement with the tapered portion of said sleeve, means preventing relative rotation between the boring bar and body member, and means for rotating the sleeve relative to the body member and boring bar.

2. The structure defined in claim 1, wherein the passage in said rotatable body member is provided with a radially enlarged end portion, and the retaining and driving disc is located within said radially enlarged end portion.

3. The structure defined in claim 1, wherein the retaining and driving disc is provided with a radially extending slot, and the means preventing relative rotation between the boring bar and body member includes a pin projecting from the body member and engaging said radially extending slot.

4. The structure defined in claim 1, wherein the body member has a tapered portion providing a bearing surface, and the sleeve has a radially extending flange engaging said bearing surface.

5. The structure defined in claim 1, wherein one end of said inclined passage is substantially concentric with the axis of rotation of the body member, and the other end of said inclined passage is eccentric with respect to the axis of rotation of the body member.

6. A quill supporting a boring bar for rotation and radial adjustment, comprising a rotatable body member having a passage therethrough concentric with the axis of rotation thereof, a sleeve rotatably positioned within said passage and having an outer surface concentric with the axis of rotation of the body member, the inner surface of the sleeve defining a passage inclined to the axis of rotation of the body member, a boring bar received within the sleeve, means for securing the boring bar within the sleeve, including an annular abutment at one end of the sleeve, an annular abutment on the boring bar centrally thereof for engagement with the annular abutment of said sleeve, a retaining and driving disc secured to one end of the boring bar adjacent the other end of the sleeve, and resilient means acting between the body member and retaining and driving disc urging the annular abutment on the boring bar into engagement with the annular abutment of said sleeve, means preventing relative rotation between the boring bar and body member, and means for rotating the sleeve relative to the body member and boring bar.

7. A quill supporting a boring bar for rotation and radial adjustment, comprising a rotatable body member having a passage therethrough concentric with the axis of rotation thereof, a sleeve rotatably positioned within said passage and having an outer surface concentric with the axis of rotation of the body member, the inner surface of the sleeve defining a passage inclined to the axis of rotation of the body member, a boring bar received within the sleeve, means for securing the boring bar within the sleeve, including a tapered portion at one end of the sleeve, an annular abutment on the boring bar centrally thereof for engagement with the tapered portion of said sleeve, a retaining and driving disc secured to one end of the boring bar adjacent the other end of the sleeve, and resilient means acting between the body member and retaining and driving disc urging the abutment into engagement with the tapered portion of said sleeve, means preventing relative rotation between the boring bar and body member, including a pin and radially extending slot acting between the body member and disc, and means for rotating the sleeve relative to the body member and boring bar.

References Cited in the file of this patent
UNITED STATES PATENTS

| | | |
|---|---|---|
| 1,148,065 | Warren | July 27, 1915 |
| 1,989,227 | Craley | Jan. 29, 1935 |
| 2,383,958 | De Vlieg | Sept. 4, 1945 |
| 2,793,545 | Benedict | May 28, 1957 |
| 2,867,031 | Briney | Jan. 6, 1959 |